July 30, 1935.  G. R. KELTIE  2,009,848
METHOD OF MANUFACTURING SUCTION ROLLS AND ASSEMBLY FOR USE THEREIN
Filed April 27, 1933  2 Sheets-Sheet 1
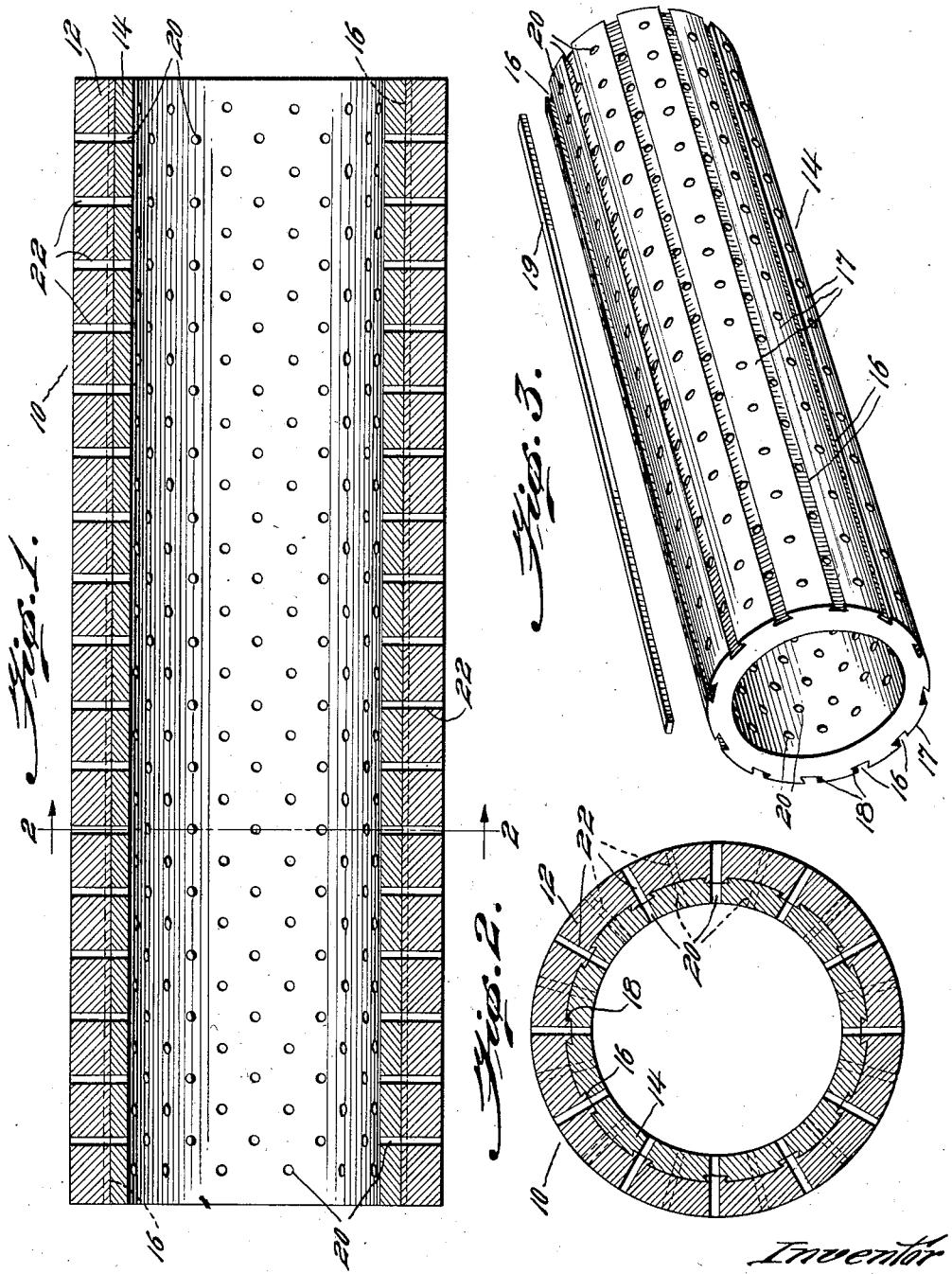

Patented July 30, 1935

2,009,848

UNITED STATES PATENT OFFICE 2,009,848

METHOD OF MANUFACTURING SUCTION ROLLS AND ASSEMBLY FOR USE THEREIN

George R. Keltie, Woonsocket, R. I., assignor to American Wringer Company, Inc., Woonsocket, R. I., a corporation of Rhode Island Application April 27, 1933, Serial No. 668,206

12 Claims. (Cl. 18—59)

My invention relates to improvements in the method of manufacture of suction rolls and assembly for use therein.

My invention is primarily adapted to the paper industry, although it is obvious that my method may be employed for covering different types of rolls having similar uses. A suction roll of the type shown in Patent No. 1,175,940, issued March 21, 1916 to H. R. Farnsworth and Thomas H. Savery, Jr. of Sandusky, Ohio, including a hollow cylindrical suction roll metal shell having alternate circumferentially spaced, preferably dove-tail axial grooves and projections on the periphery thereof, and having a multiplicity of radial holes therein, rubber strips inserted within said grooves, a rubber covering vulcanized thereto and having radial holes therein aligned with the radial holes in the shell, has been manufactured for many years. The rubber covering is preferably vulcanized to the roll and the roll has had some sort of means, such as the alternate axial grooves and projections explained above to prevent the rubber from slipping on the interior metal shell. These types of rolls have worked out well in practice with the exception that the outside rubber covering having all the wear thereon has tended to wear off and some method of recovering the roll has been found desirable. This has sometimes been done hitherto by individually drilling through the rubber each one of the radial holes. This has been an extremely expensive and difficult operation, it being extremely hard to drill from the inside through the already existing multiplicity of holes in the shell, and it also has been extremely difficult to align the drill with the shell holes when drilling from the outside of the covering.

An object of my invention therefore is to provide a novel, simple and economical method for recovering the shell's exterior with rubber. If desired, however, in place of simultaneously drilling the original shell and rubber covering with aligned holes, as illustrated in the Farnsworth et al. patent, I may if desired, merely drill the holes in the shell and make the holes in the initial outer covering according to my method. Thus my improved method may be used for either originally covering the roll, or recovering a worn out roll. As my invention eliminates expensive jigs, and the hand labor required in lining up drilled holes in the rubber covering with those in the shell, it is obvious that particularly in recovering it is much more economical than any method hitherto employed.

A further feature of my invention is to provide a novel assembly of the various elements employed in my process prior to vulcanization.

These and such other objects of my invention as may hereinafter appear will be best understood from a description of the accompanying drawings, which illustrate an embodiment thereof.

In the drawings, Fig. 1 is a central longitudinal sectional view of a completed suction roll covered in accordance with my process.

Fig. 2 is a transverse sectional view thereof.

Fig. 3 is a perspective view showing the interior hollow cylindrical metal shell provided with the spaced counter sunk grooves therein adapted to receive the axial rubber strips therein, an initial step in my method.

Figure 6:
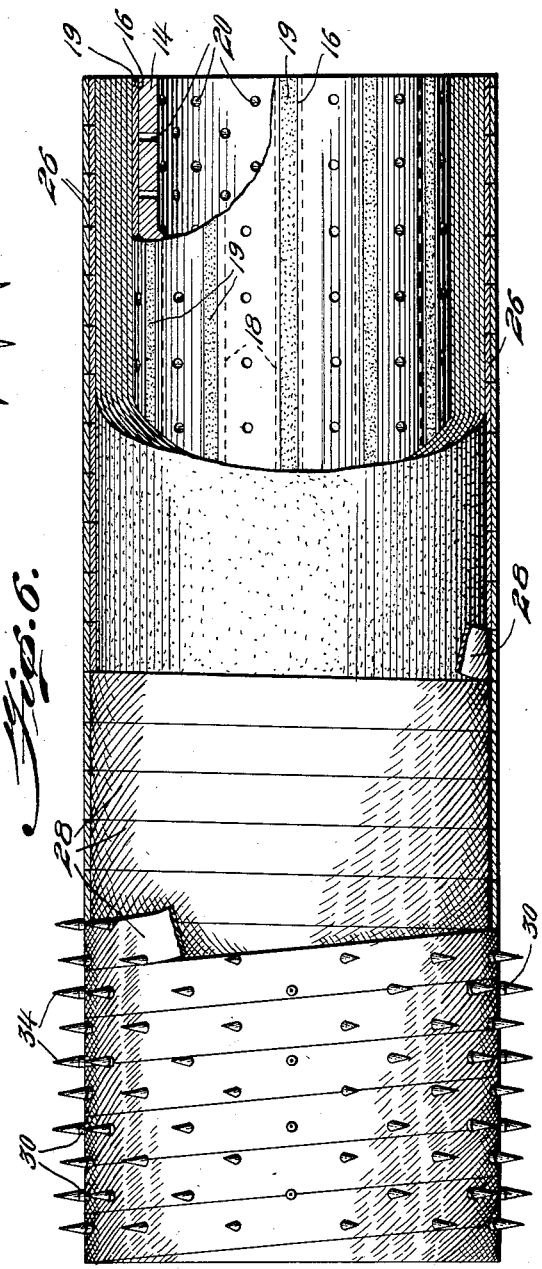

Fig. 6 is a diagrammatic side elevation illustrating diagrammatically the steps in the method of making my assembly for vulcanization showing at the right hand end a section through the roll, immediately to the left the rubber covering in elevation, further on the vulcanizing tape in elevation and at the left the ends of the pins after they have been driven outwardly through the rubber covering and vulcanizing tape prior to vulcanization.

In the drawings wherein like characters of reference indicate like parts throughout, 10 generally indicates a suction roll covered in accordance with my invention.

As stated hitherto, my improved roll is primarily adapted for use as a suction roll in the manufacture of paper wherever such suction rolls are employed, although it is obvious that my improved method and assembly may be employed for suction or other rolls for other uses. Said suction rolls may comprise the cylindrical hollow shell preferably constructed of metal and a plastic covering moulded thereto, in my preferred embodiment being constructed of vulcanized rubber. Said roll is also preferably provided with a large plurality of aligned radial holes extending through the interior shell and outer plastic covering. The specific type of roll shown in Fig. 1 as stated hitherto has been known and employed in the paper industry for many years, and it is particularly for the problem of economically, efficiently and cheaply covering the shell of such a roll that my invention relates. To prevent the rubber covering 12 from slipping on the shell 14, the shell 14 is preferably provided with a plurality of spaced axial channels or grooves 16 dove-tailed as at 18. These channels are adapted to receive the rubber projections from the inner surface of the rubber covering 12. These are formed by laying rubber strips 19 within said channels. These projections or strips 19 are adapted to be vulcanized to the interior of the surface of the rubber covering 12, and both strips and covering to the outer surface of the shell. Said roll including the shell and covering is preferably provided with a large plurality of radial holes therein extending in alignment through the covering 12, strips 19 where employed and shell 14. When said roll is made initially in accordance with the teachings with the Farnsworth patent heretofore referred to, the rubber covering 12 is first vulcanized to the shell 14 and the holes 20 are drilled therein in the usual manner. As stated hitherto a great deal of trouble has been experienced due to the fact that the rubber covering (Fig. 12) is more exposed to wear than the inner shell, and therefore, is apt to wear off and the shells 14 have lasted much longer than the initial covering 12 and it has been desired in practice to save the shells 14 and recover the roll. If the shell 14 is recovered with another covering 12 and then it is attempted to drill the holes, this is an extremely expensive and difficult method as it is extremely difficult to drill from the inside and very difficult in drilling from the outside to bring the holes 22 in the rubber covering in alignment with the holes 20 in the shell 14. The cost of jigs and the labor inherent in doing this has been almost prohibitive, so costly rubber coverings have not been extensively used. Employing my method, however, it is possible to recover the old shells 14 at a small cost, or if desired to initially cover the rolls 12 after the holes 20 have been drilled in the metal shell 14. By my method the holes 22 in the covering are made in exact alignment with the holes 20 in the shell.

Figure 5:
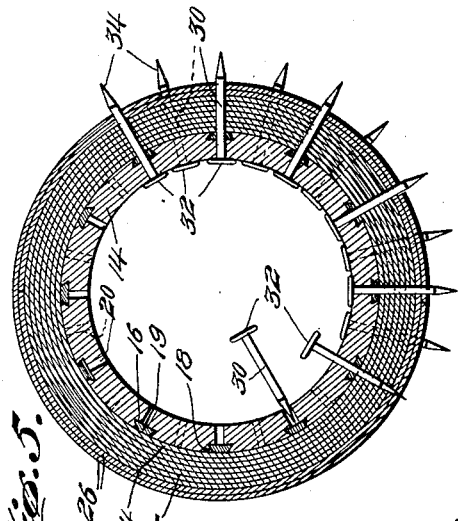
Fig. 5 is a transverse sectional view similar to Fig. 4 illustrating how my improved type of headed pins may be inserted radially outwards through the shell holes and knocked radially outwards to form aligned holes through the rubber covering from within.
Figure 4:
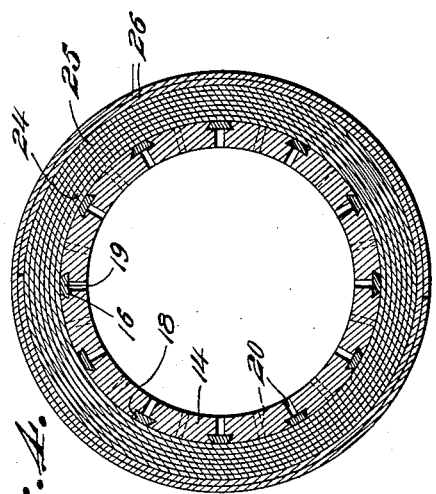
Fig. 4 is a transverse sectional view illustrating the shell shown in Fig. 3 with the axial rubber strips inserted therein and covered with a wrapping of hard and soft rubber and wound with so-called vulcanizing tape, or vulcanizing covering normally employed to cover and hold the rubber surface during the vulcanization in the desired end position.

Employing my invention therefore, either on a new or an old shell 14, as shown in Fig. 3, preferably as also shown in said Farnsworth patent provided with the grooves 16, dove-tailed as at 18 therein and with the large plurality of desired radial holes 20 extending at spaced intervals through the periphery thereof both in the dove-tailed grooves 16 and the projections 17 between said grooves at the desired spaced intervals over the entire periphery of the shell 14, I then, in accordance with the teachings of the Farnsworth patent, insert rectangular rubber strips 19 within said grooves 16 and I then as shown in Figs. 4–6 wrap a covering of rubber around the shell 14 and the strips 19 inserted within said grooves 16, preferably an inner layer 24 of harder rubber and an outer layer 25 of softer rubber. I then for vulcanizing purposes cover the outer surface with a suitable vulcanizing covering 26. While any type of vulcanizing covering such as a mould may be employed, I preferably employ the so-called vulcanizing tape constructed of textile fabric 28 shown in Fig. 6 wrapped helically around the rubber coverings 24 and 25. I preferably employ a number of layers of said tape 28 oppositely helically wound.

In order to form the aligned holes 22 in the rubber covering in exact alignment with the radial holes 20 in the shell 14 I then employ a plurality of headed pins 30 provided with the heads 32 and the points 34 and of such a length to completely extend radially through the thickness of the shell 14 and covering 12. To assist in knocking the pins from the rubber the sides thereof may be tapered, if desired. As said pins 30 are pointed as at 34, as shown in Figs. 5 and 6, they may be readily inserted within the holes 20 and by knocking on the heads 32 thereof they may be knocked radially outwards, so that the points 34 will pierce the rubber covering to provide the holes 22 therein and vulcanizing strip 28, and so that in practice the points 34 thereof project radially outwardly through the covering 12 and vulcanizing tape 28 as shown in Figs. 5 and 6. I preferably cover said pins or spikes with a suitable moulding solution as is employed in the stock vulcanization of rubber, so that when the vulcanization is complete they will not stick to the rubber, and may be readily knocked out. It is thus obvious that at this point of my method I have provided a novel manufacturing assembly consisting of a hollow cylindrical suction roll shell, preferably having the circumferentially spaced alternate dove-tailed axial grooves and projections in the periphery thereof, having a multiplicity of radial holes therein, rubber strips lying axially within said grooves, rubber covering wound over said strips and shell, a vulcanizing covering, preferably of vulcanizing tape wound over said rubber covering and with a plurality of headed pins preferably coated with a moulding solution, projecting radially outwardly through said shell holes, rubber covering and vulcanizing tape with the heads thereof contained within said shell to form holes 22 in said rubber covering in alignment with the holes 20 in said shell.

This assembly is then subjected to a suitable vulcanizing temperature to vulcanize in the usual manner the rubber covering to said rubber strips and said rubber strips and covering to the projections and grooves of said shell, where dove-tailed grooves are employed, the upper strips spreading to fill up the grooves. After vulcanization it is obvious that the pins may be readily knocked out by a sharp rap on the projecting points 34 thereof, and being coated with a moulding solution they will readily fall away and they will not become vulcanized to the rubber covering, leaving the holes 22 in the rubber covering.

It is obvious that the labor involved in inserting the pins is inconsequential compared to the labor of attempting to align drills and the labor in knocking the pins out is relatively insignificant. It is apparent that it is obvious that in place of rubber equivalent plasticable compounds may be employed, which may be rendered plastic and similarly adhered to the shell in any well known manner. It is apparent therefore, that I have provided the novel method and assembly for use in the manufacture of coverings for shells for suction or similar rolls with the advantages portrayed above.

It is understood that my invention is not limited to the specific embodiments shown and that various deviations may be made therefrom without departing from the spirit and scope of the appended claims.

What I claim is:

1. The method of covering hollow suction roll cylindrical shells having alternate circumferentially spaced dove-tailed axial grooves and projections on the periphery thereof having a multiplicity of radial holes therein, which comprises, inserting rubber strips axially within said grooves, wrapping a rubber covering over said grooves and projections, helically winding a strip of vulcanizing tape over said rubber covering, inserting a plurality of headed pins coated with moulding solution radially outwardly through said shell holes, rubber covering and vulcanizing tape with the head contained within said shell, subjecting said assembly to a vulcanizing temperature to vulcanize said rubber covering to said rubber strips and said strips and covering to the projections and grooves of said shell and knocking said pins radially inwardly from the holes formed thereby in said rubber covering aligned with said shell holes.

2. The method of covering hollow suction roll shells having alternate circumferentially spaced dove-tail axial grooves and projections on the periphery thereof having a multiplicity of radial holes therein which comprises, inserting rubber strips axially within said grooves, wrapping a rubber covering over said grooves and projections, placing a vulcanizing covering over said rubber covering, inserting a plurality of headed pins radially outwardly through said shell holes and rubber covering, and with the heads contained within said shell, subjecting said assembly to a vulcanizing temperature to vulcanize said rubber covering to said rubber strips and said strips and covering to the projections and grooves of said shell and knocking said pins radially inwardly from the holes formed thereby in said rubber covering aligned with said shell holes.

3. The method of covering hollow suction roll cylindrical shells having alternate circumferentially spaced axial grooves and projections on the periphery thereof having a multiplicity of radial holes therein which comprises, inserting rubber strips axially within said grooves, wrapping a rubber covering over said grooves and projections, helically winding a strip of vulcanizing tape over said rubber covering, inserting a plurality of headed pins coated with moulding solution radially outwardly through said shell holes, rubber covering and vulcanizing tape with the heads contained within said shell, subjecting said assembly to a vulcanizing temperature to vulcanize said rubber covering to said rubber strips and said strips and covering to the projections and grooves of said shell and knocking said pins radially inwardly from the holes formed thereby in said rubber covering aligned with said shell holes.

4. The method of covering hollow suction roll shells having alternate circumferentially spaced axial grooves and projections on the periphery thereof, having a multiplicity of radial holes therein which comprises inserting rubber strips axially within said grooves, wrapping a rubber covering over said grooves and projections, placing a vulcanizing covering over said rubber covering, inserting a plurality of headed pins radially outwardly through said shell holes, rubber covering and vulcanizing covering with the heads contained within said shell, subjecting said assembly to a vulcanizing temperature to vulcanize said rubber covering to said rubber strips and said strips and covering to the projections and grooves of said shell and knocking said pins radially inwardly from the holes formed thereby in said rubber covering aligned with said shell holes.

5. An assembly for use in the manufacture of suction rolls, comprising a hollow suction roll cylindrical shell, having alternate circumferentially spaced dove-tail axial grooves and projections on the periphery thereof, and having a multiplicity of radial holes therein, rubber strips inserted axially within said grooves, a rubber covering over said strips and projections, a strip of vulcanizing tape helically wound over said rubber covering, and a plurality of headed pins coated with moulding solution inserted radially outwardly through said shell holes, rubber covering and vulcanizing tape with the heads contained within said shell.

6. An assembly for use in the manufacture of suction rolls, comprising a hollow suction roll shell, having alternate circumferentially spaced dove-tailed axial grooves and projections on the periphery thereof, having a multiplicity of radial holes therein, rubber strips inserted axially within said grooves, a rubber covering over said grooves and projections, a vulcanizing covering over said rubber covering, and a plurality of headed pins inserted radially outwardly through said shell holes, rubber covering and vulcanizing covering, with the heads contained within said shell.

7. An assembly for use in the manufacture of suction rolls, comprising a hollow suction roll cylindrical shell, having alternate circumferentially spaced axial grooves and projections on the periphery thereof having a multiplicity of radial holes therein, rubber strips inserted axially within said grooves, a rubber covering over said strips and projections, a strip of vulcanizing tape helically wound over said rubber covering and a plurality of headed pins coated with moulding solution inserted radially outwardly through said shell holes, rubber covering and vulcanizing covering with the heads contained within said shell.

8. An assembly for use in the manufacture of suction rolls, comprising a hollow suction roll shell having alternate circumferentially spaced axial grooves and projections on the periphery thereof, having a multiplicity of radial holes therein, rubber strips inserted axially within said grooves, a rubber covering over said strips and projections, a vulcanizing covering over said rubber covering and a plurality of headed pins inserted radially outwardly through said shell holes rubber covering and vulcanizing covering with the heads contained within said shell.

9. The method of covering hollow suction roll cylindrical shells having alternate circumferentially spaced dove-tail axial grooves and projections on the periphery thereof having a multiplicity of radial holes therein, which comprises inserting plastic strips axially within said grooves wrapping a plasticizable covering over said strips and projections, helically winding a strip of plasticizing tape over said plasticizable covering, inserting a plurality of headed pins coated with moulding solution radially outwardly through said shell holes, plastic covering and plasticizing tape with the heads contained within said shell, subjecting said assembly to a plasticizing temperature to plasticize said plastic covering to said plastic strips and said strips and covering to the projections and grooves of said shell and knocking said pins radially inwardly from the holes formed thereby in said plastic covering aligned with said shell holes.

10. An assembly for use in the manufacture of suction rolls, comprising a hollow suction roll cylindrical shell having alternate circumferentially spaced dove-tail axial grooves and projections on the periphery thereof, and having a multiplicity of radial holes therein, plastic strips inserted axially within said grooves, a plastic covering over said strips and projections, a strip of plasticizing tape helically wound over said plastic covering and a plurality of headed pins coated with moulding solution inserted radially outwardly through said shell holes, plastic covering and plasticizing tape with the heads contained within said shell.

11. The method of covering hollow suction roll shells having dove tail recesses and projections on the periphery thereof, and having a multiplicity of radial holes therein which comprises, inserting rubber within said dove-tail recesses, wrapping a rubber covering over said dove tail recesses and projections, placing a vulcanizing covering over said rubber covering, inserting a plurality of headed pins radially outwardly through said shell holes, rubber covering and vulcanizing covering with the heads contained within said shell, subjecting said assembly to a vulcanizing temperature to vulcanize said rubber covering to said rubber within said recesses and said rubber and covering to the projections and dovetail recesses of said shell and knocking said pins radially inwardly from the holes formed thereby in said rubber covering aligned with said shell holes.

12. The method of covering hollow suction roll shells having dove tail grooves and projections on the periphery thereof, and having a multiplicity of radial holes therein which comprises, inserting rubber within said dove tail grooves, wrapping a rubber covering over said dove tail grooves and projections, placing a vulcanizing covering over said rubber covering, inserting a plurality of headed pins radially outwardly through said shell holes, rubber covering and vulcanizing covering with the heads contained within said shell, subjecting said assembly to a vulcanizing temperature to vulcanize said rubber covering to said rubber within said grooves and said rubber and covering to the projections and dove tail grooves of said shell and knocking said pins radially inwardly from the holes formed thereby in said rubber covering aligned with said shell holes.

GEORGE R. KELTIE.